United States Patent
Molinar Olivas (10) Patent No.: US 10,160,299 B2
(45) Date of Patent: Dec. 25, 2018

(54) PICKUP COVER SYSTEM

(71) Applicant: Fernando Molinar Olivas, Glen Ellen, CA (US)

(72) Inventor: Fernando Molinar Olivas, Glen Ellen, CA (US)

( * ) Notice: Subject to any disclaimer, the term of this patent is extended or adjusted under 35 U.S.C. 154(b) by 72 days.

(21) Appl. No.: 15/340,679

(22) Filed: Nov. 1, 2016

(65) Prior Publication Data
US 2018/0118005 A1    May 3, 2018

(51) Int. Cl.
*B60J 7/14* (2006.01)
*B60J 7/16* (2006.01)

(52) U.S. Cl.
CPC ......... *B60J 7/1614* (2013.01); *B60Y 2200/14* (2013.01)

(58) Field of Classification Search
CPC ........ B60J 7/1614; B60J 7/1607; B60J 7/141; B60Y 2200/14
USPC ................. 296/26.06, 26.07, 100.01, 100.08
See application file for complete search history.

(56) References Cited

U.S. PATENT DOCUMENTS

| | | | | |
|---|---|---|---|---|
| 5,364,154 A * | 11/1994 | Kaiser | ..................... | B60P 3/341 135/88.05 |
| 5,366,266 A | 11/1994 | Harbison | | |
| 6,209,944 B1 | 4/2001 | Billiu et al. | | |
| 6,663,160 B2 * | 12/2003 | Yarbrough | ............... | B60J 7/141 296/100.01 |
| 6,749,252 B2 * | 6/2004 | Cervenka | ................ | B60P 3/341 296/165 |
| 6,814,387 B2 | 11/2004 | Lake | | |
| 7,243,965 B2 * | 7/2007 | King | ...................... | B60J 7/1614 296/164 |
| 7,264,297 B2 | 9/2007 | Boulard et al. | | |
| 7,281,744 B1 | 10/2007 | Schultz | | |
| 7,384,089 B1 * | 6/2008 | Ablang | ..................... | B60J 7/141 296/100.08 |
| 7,404,586 B2 | 7/2008 | Seiberling | | |
| 7,806,457 B2 | 10/2010 | Bankert | | |
| 8,757,699 B2 | 6/2014 | Kalack | | |
| 9,403,424 B2 * | 8/2016 | Cortez | ..................... | B60J 7/141 |
| 9,771,028 B2 * | 9/2017 | Finestone | ................. | B60P 3/40 |
| 9,849,763 B1 * | 12/2017 | Sullivan | .................... | B60J 7/12 |
| 2001/0038225 A1 | 11/2001 | Muirhead | | |
| 2018/0043759 A1 * | 2/2018 | Rohr | ...................... | B60J 7/1621 |

FOREIGN PATENT DOCUMENTS

WO    WO-2009089604 A1 *  7/2009  ............ B60J 7/1614
WO    WO-2017125113 A1 *  7/2017

* cited by examiner

*Primary Examiner* — Pinel E Romain (57) ABSTRACT

A pickup cover system includes a vehicle that has a cab and a bed. A lid unit is movably coupled to the bed. A pair of lifting units is provided. Each of the lifting units is coupled between the bed and the lid unit. Moreover, each of the lifting unit selectively urges the lid unit upwardly and downwardly with respect to the bed. A wall unit is movably coupled to the lid unit. The wall unit is selectively positioned in a stored position. The wall unit is selectively positioned in a deployed position. Thus, the wall unit extends between the lid unit and the bed when the lid unit is positioned in the open position.

13 Claims, 7 Drawing Sheets

PICKUP COVER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cover devices and more particularly pertains to a new cover device for facilitating a lid having an adjustable height with respect to a pickup bed.

BRIEF SUMMARY OF THE INVENTION

An embodiment of the disclosure meets the needs presented above by generally comprising a vehicle that has a cab and a bed. A lid unit is movably coupled to the bed. A pair of lifting units is provided. Each of the lifting units is coupled between the bed and the lid unit. Moreover, each of the lifting unit selectively urges the lid unit upwardly and downwardly with respect to the bed. A wall unit is movably coupled to the lid unit. The wall unit is selectively positioned in a stored position. The wall unit is selectively positioned in a deployed position. Thus, the wall unit extends between the lid unit and the bed when the lid unit is positioned in the open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new cover device embodying the principles and concepts of an embodiment of the disclosure and generally designated by the reference numeral 10 will be described.

As best illustrated in FIGS. 1 through 7, the pickup cover system 10 generally comprises a vehicle 12 that has a cab 14 and a bed 16. The bed 16 has a peripheral wall 18. The peripheral wall 18 has a top edge 20, a first lateral side 21, a second lateral side 22 and an inwardly facing surface 24. The vehicle 12 may be a pickup or the like.

A lid unit 26 is provided and the lid unit 26 is movably coupled to the bed 16. The lid unit 26 is selectively positioned in a closed position having the lid unit 26 lying on the bed 16. The lid unit 26 is selectively positioned in an open position. Thus, the lid unit 26 is spaced a selected distance from the bed 16.

The lid unit 26 comprises a cover 28 that has a top wall 30 and a perimeter wall 32 extending downwardly therefrom. The perimeter wall 32 has a first lateral side 34, a second lateral side 36, a front side 38, a back side 40 and a distal edge 42 with respect to the top wall 30. The distal edge 42 is aligned with and is coextensive with the top edge 20 of the bed 16. The distal edge 42 abuts the top edge 20 when the lid unit 26 is positioned in the closed position. Moreover, the distal edge 42 is spaced from the top edge 20 when the lid unit 26 is positioned in the open position.

The top wall 30 has a lower surface 44. The cover 28 includes a divider 46. The divider 46 is spaced from the lower surface 44 to define a storage space 48. The storage space 48 is open on each of the first lateral side 34 and the second lateral side 36 corresponding to the cover 28.

A pair of lifting units 50 is provided. Each of the lifting units 50 is coupled between the bed 16 and the lid unit 26. Moreover, each of the lifting unit selectively urges the lid unit 26 upwardly and downwardly with respect to the bed 16. The pair of lifting units 50 includes a first lifting unit 52 and a second lifting unit 54. The first lifting unit 52 is coupled to the first lateral side 21 of the bed 16. The second lifting unit 54 is coupled to the second lateral side 22 of the bed 16.

Each of the lifting units 50 comprises a plate 56. The plate 56 has a bottom surface 58 and a top surface 60. The bottom surface 58 is coupled to the top edge 20 of the bed 16. A pair of sleeves 62 is provided. Each of the sleeves 62 has an upper end 64, a lower end 66 and an outer wall 68 extending therebetween.

The outer wall 68 has an inner surface 70. The outer wall 68 corresponding to each of the sleeves 62 is coupled to the inwardly facing surface 24 of the bed 16. Each of the sleeves 62 is vertically oriented in the bed 16. The upper end 64 corresponding to each of the sleeves 62 is aligned with the top edge 20 of the bed 16. The sleeves 62 are spaced apart from each other on the bed 16. A tab 72 is coupled to and extends inwardly from the inwardly facing surface 24. The tab 72 is coextensive with the associated sleeve 62.

A pair of bracket units 74 is provided. Each of the bracket units 74 is slidably positioned in an associated one of the sleeves 62. Moreover, each of the bracket units 74 is coupled to distal edge 42 of the cover 28. Each of the bracket units 74 extends between the cover 28 and the associated sleeve when the lid unit 26 is positioned in the open position.

Each of the bracket units 74 comprises a first track 76 that has a first side 78. The tab 72 on the associated sleeve slidably engages the first side 78 of the first track 76. The tab 72 may comprise a stem and a head oriented transverse to the stem. The stem may extend into the track and the head may engage the track. Thus, the tab 72 may be inhibited from being removed from the first track 76.

A second track 80 is provided that has a first end 82 and a primary surface 84. The second track 80 has a bend 86 thereon. The bend 86 is aligned with the first end 82 to define a hook 88. The first end 82 is positioned beneath the divider 46. Moreover, the first end 82 is directed toward a center of the bed 16.

A plurality of supports 90 is provided. Each of the supports 90 comprises a first half 92 that is hingedly coupled to a second half 94. Each of the supports 90 is hingedly coupled between the first track 76 and the second track 80. The supports 90 are spaced apart from each other and are distributed along each of the first track 76 and the second track 80.

Each of the first track 76 and the second track 80 is positioned in the associated sleeve when the lid unit 26 is positioned between a minimum height and a maximum height. The second track 80 is spaced from the first track 76 when the lid unit 26 is positioned at the maximum height. Additionally, the second track 80 is removed from the sleeve when the lid unit 26 is positioned at the maximum height. Thus, the second track 80 is positioned above the plate 56. The maximum height may be a height ranging between approximately one meter and one and two meters.

Figure 1:
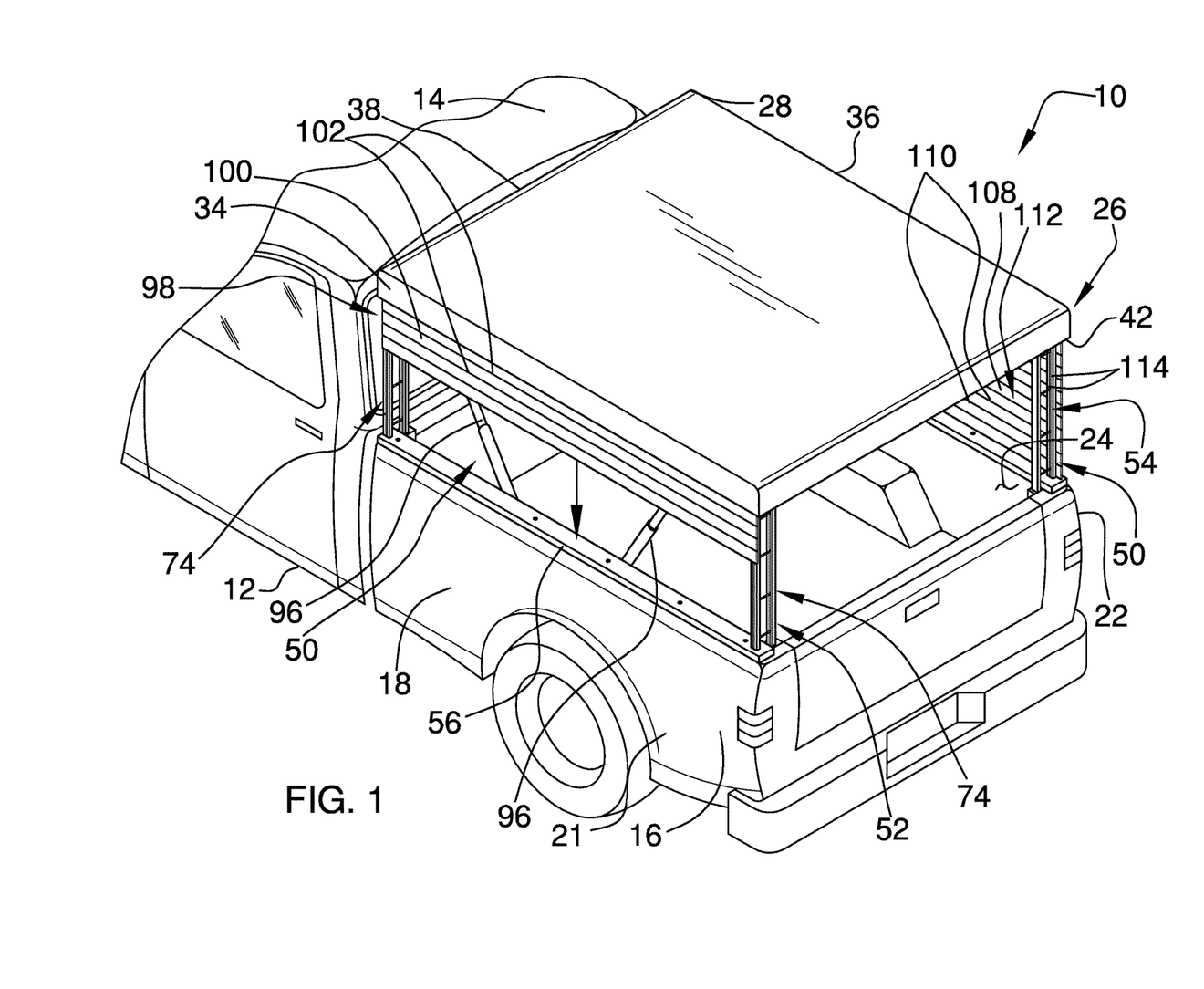
FIG. 1 is a top perspective view of a pickup cover system according to an embodiment of the disclosure.
Figure 2:
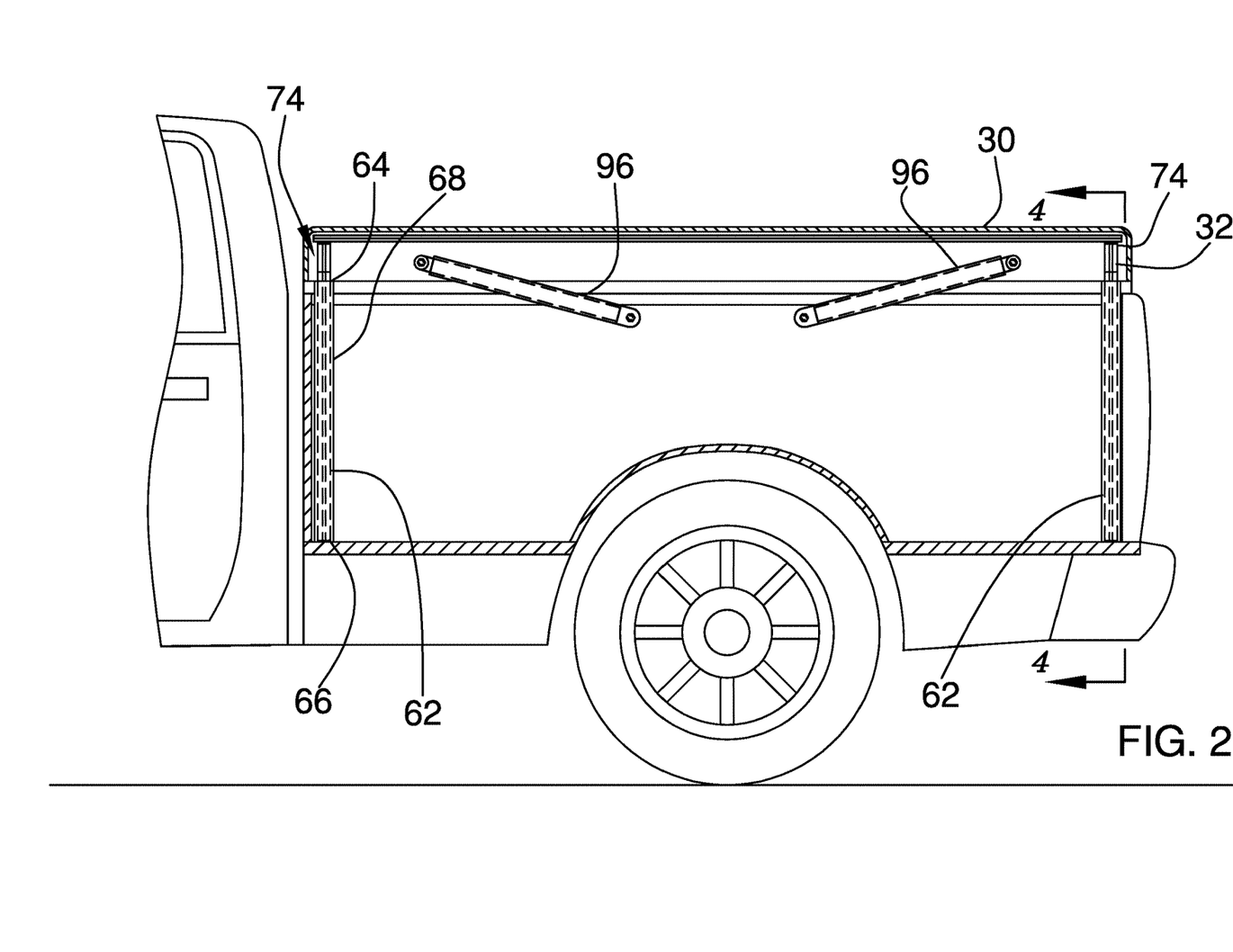
FIG. 2 is a left side cut-away view of an embodiment of the disclosure showing a lid unit in a closed position.
Figure 3:
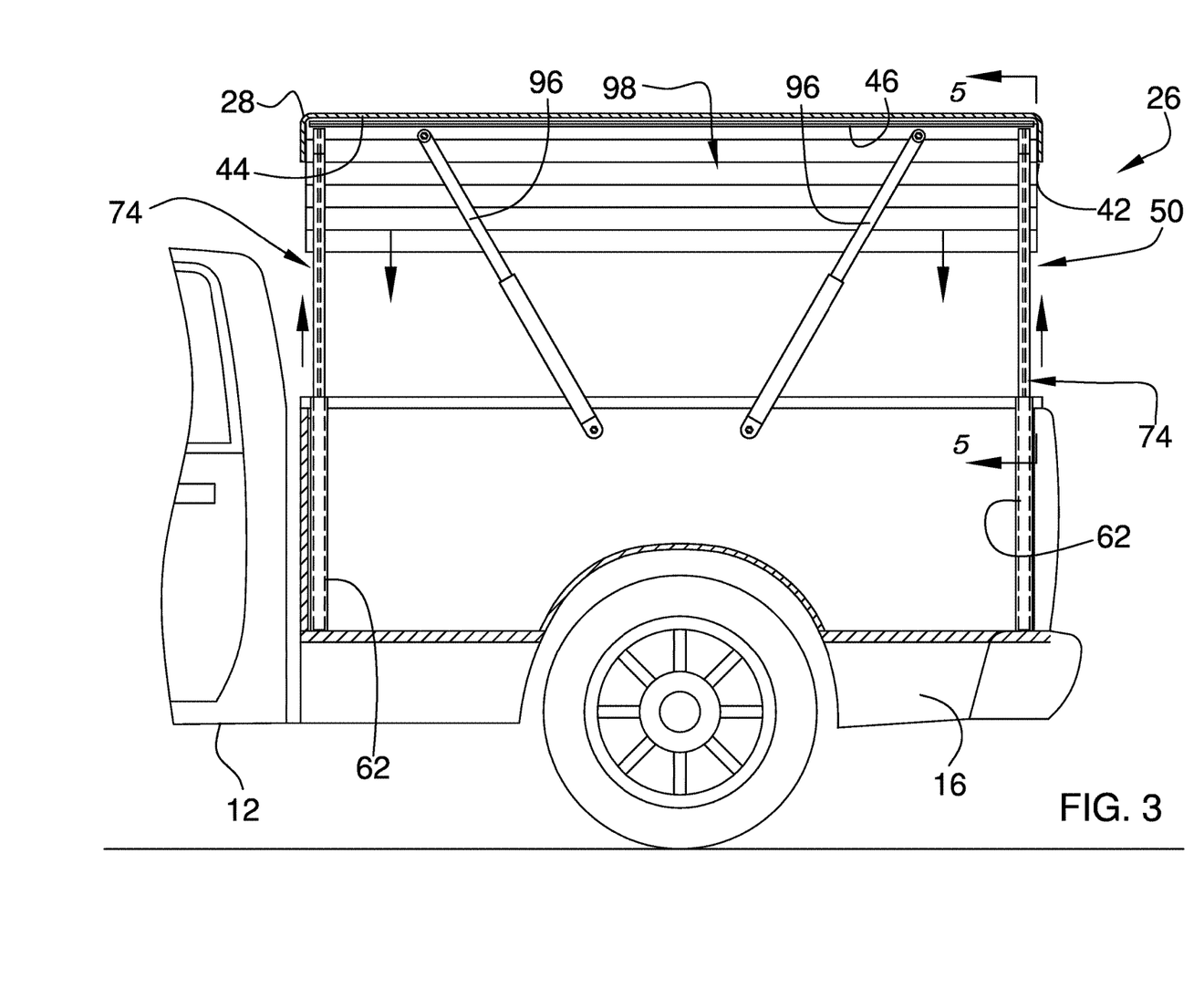
FIG. 3 is a left side cut-away view of an embodiment of the disclosure showing a lid unit in an open position.
Figure 4:
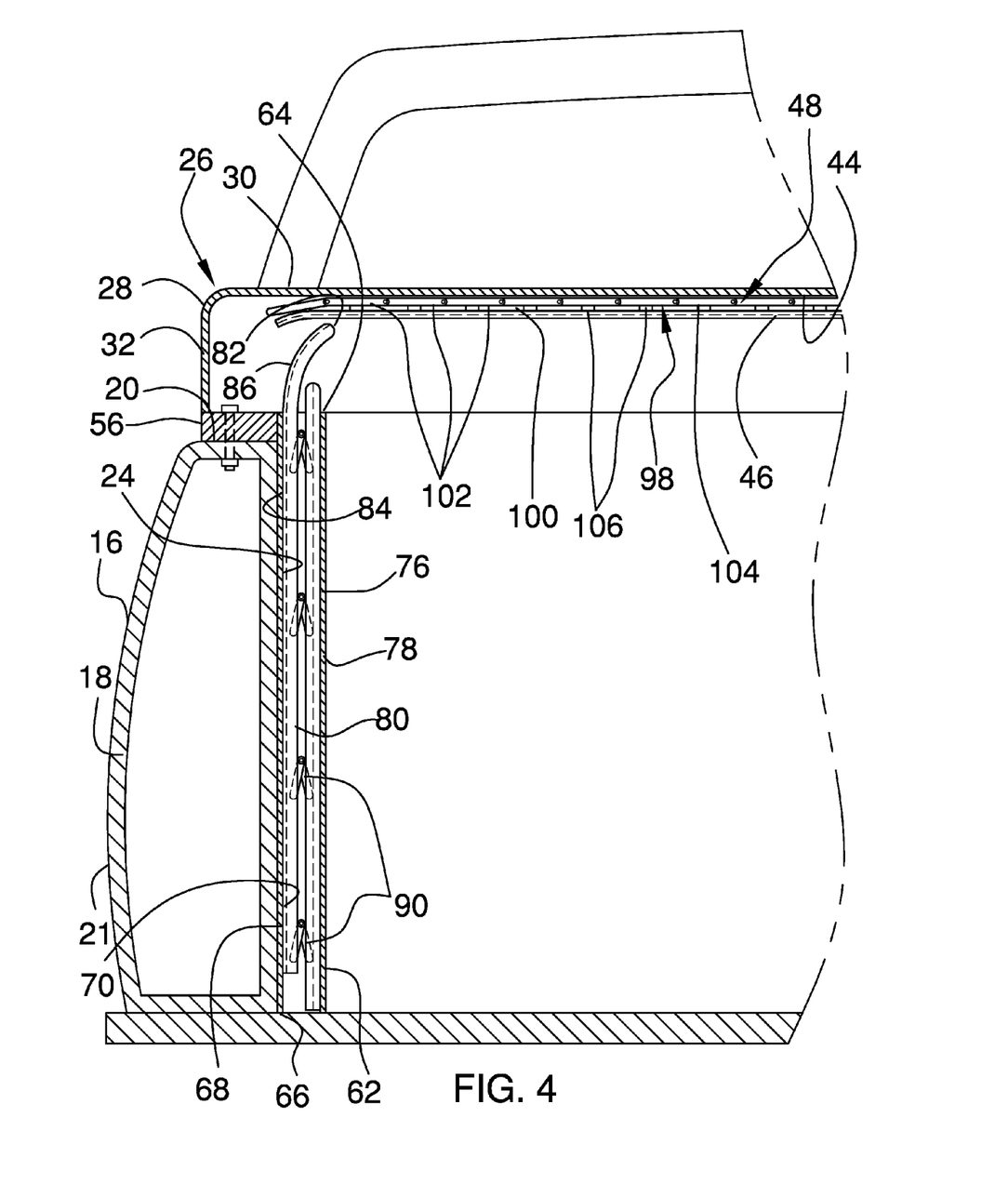
FIG. 4 is a cross sectional view taken along line 4-4 of FIG. 2 of an embodiment of the disclosure.
Figure 5:
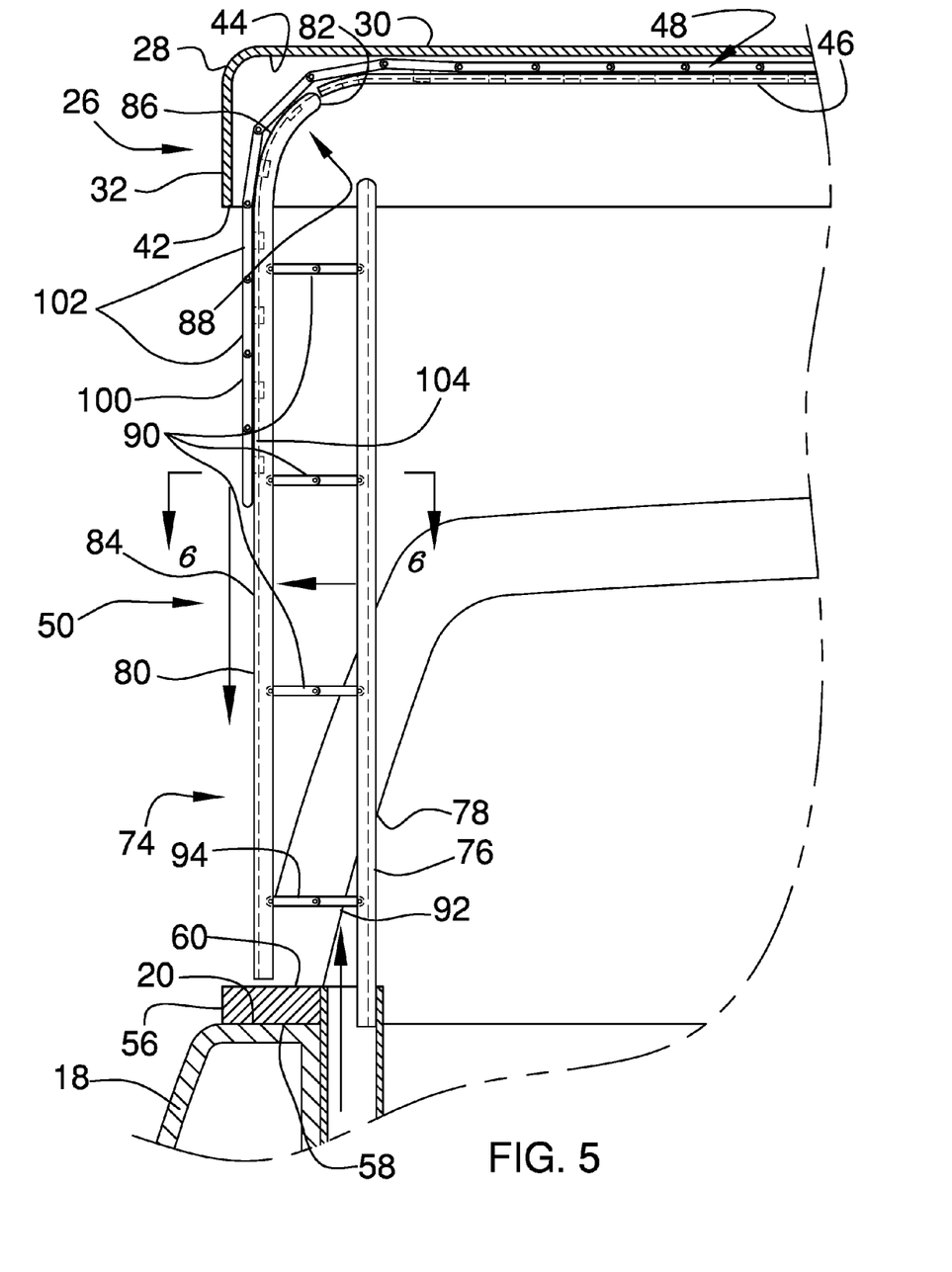
FIG. 5 is a cross sectional view taken along line 5-5 of FIG. 3 of an embodiment of the disclosure.
Figure 6:
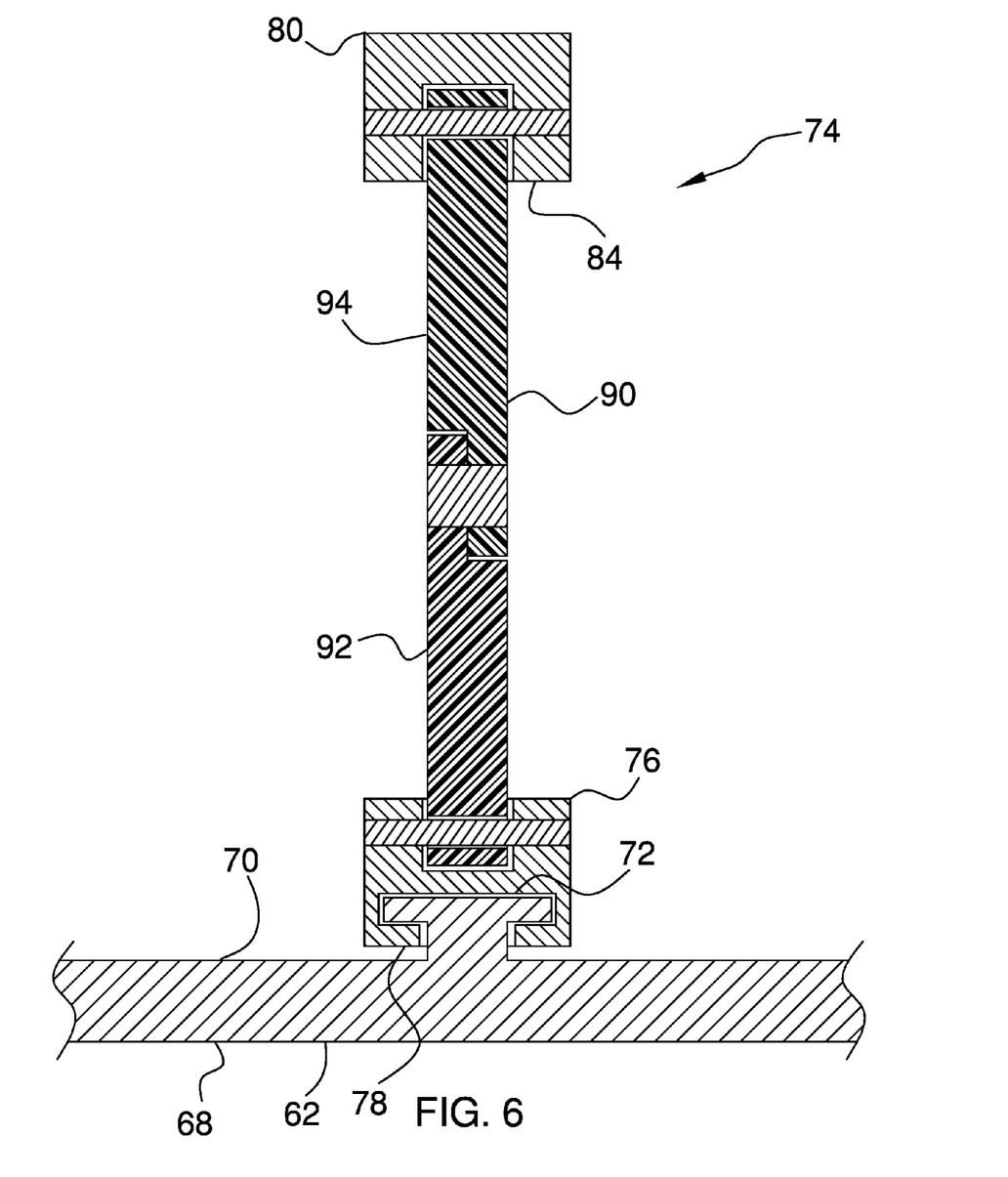
FIG. 6 is a cross sectional view taken along line 6-6 of FIG. 5 of an embodiment of the disclosure.
Figure 7:
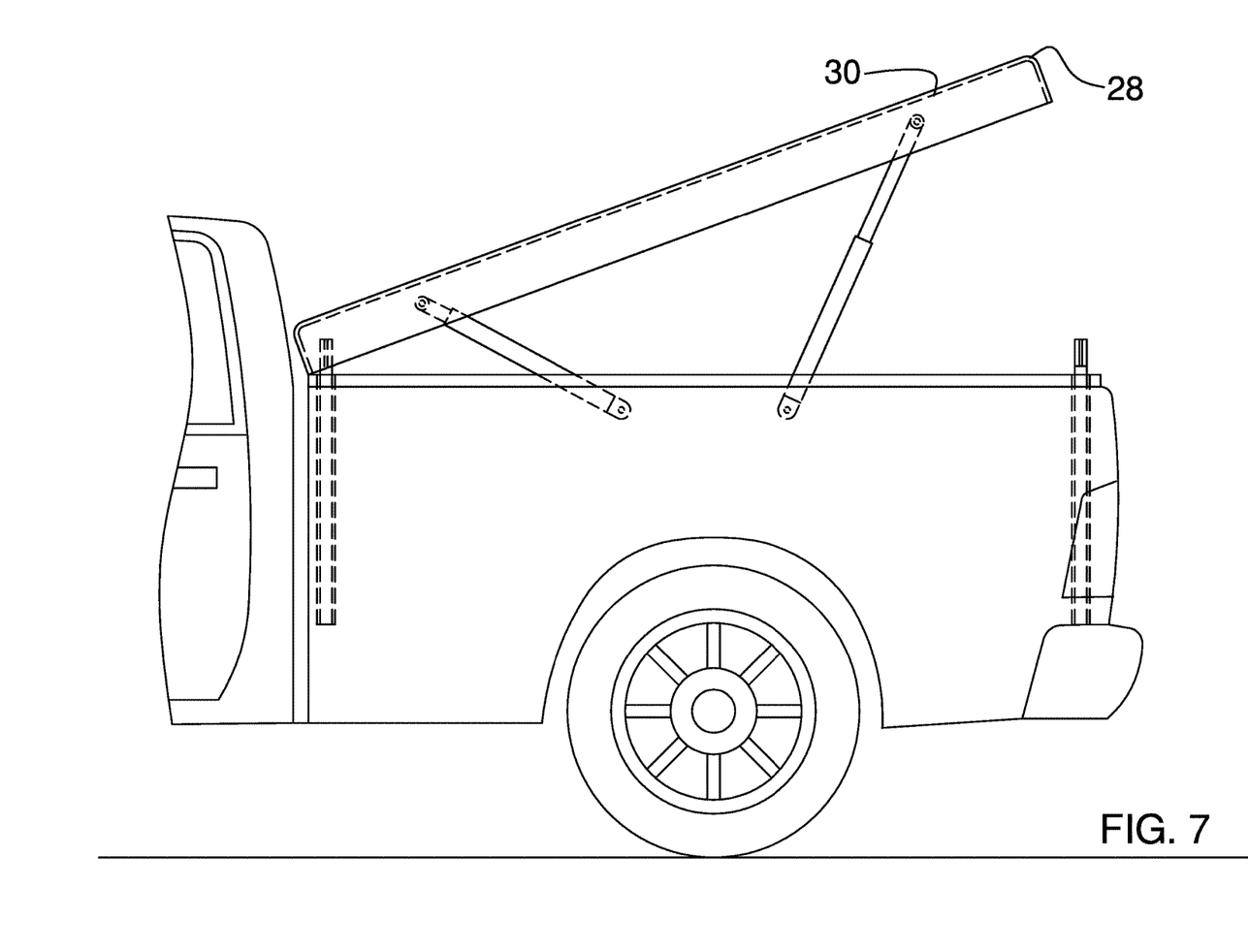
FIG. 7 is a left side phantom view of an embodiment of the disclosure.

A pair of pistons 96 is provided. Each of the pistons 96 is coupled between the peripheral wall 18 of the bed 16 and the cover 28. Moreover, each of the pistons 96 selectively urges the cover 28 away from the top edge 20 of the bed 16. Each of the pistons 96 may be a pneumatic piston or the like. As shown in FIG. 7, each of the bracket units 74 may be removably coupled to the cover 28. Thus, the back side 40 of the cover 28 may be lifted to access the bed 16.

A wall unit 98 is provided and the wall unit 98 is movably coupled to the lid unit 26. The wall unit 98 is selectively positioned in a stored position. Thus, the wall unit 98 is coextensive with the lid unit 26. The wall unit 98 is selectively positioned in a deployed position. Thus, the wall unit 98 extends between the lid unit 26 and the bed 16 when the lid unit 26 is positioned in the open position. The wall unit 98 protects objects in the bed 16 when the lid unit 26 is in the open position.

The wall unit 98 comprises a first screen 100. The first screen 100 comprises a plurality of hinged sections 102. The first screen 100 has a lower surface 104 and the first screen 100 is slidably positioned in the storage space 48. Moreover, the first screen 100 extends substantially between the front side 38 and the back side 40 of the cover 28. The first screen 100 is selectively positioned in a deployed position. Thus, the first screen 100 extends downwardly between the cover 28 and the bed 16 when the lid unit 26 is positioned in the open position.

A plurality of first rollers 106 is provided. Each of the first rollers 106 is coupled to the lower surface 104 of the first screen 100. Moreover, each of the first rollers 106 engages the divider 46. Each of the first rollers 106 engages the primary surface 84 of the second track 80 corresponding to the first lifting unit 52 when the first screen 100 is positioned in the deployed position.

A second screen 108 is provided. The second screen 108 comprises a plurality of hinged sections 110. The second screen 108 has a lower surface 112 and the second screen 108 is slidably positioned in the storage space 48. Moreover, the second screen 108 extends substantially between the front side 38 and the back side 40 of the cover 28. The second screen 108 is selectively positioned in a deployed position. Thus, the second screen 108 extends downwardly between the cover 28 and the bed 16 when the lid unit 26 is positioned in the open position.

A plurality of second rollers 114 is provided. Each of the second rollers 114 is coupled to the lower surface 112 of the second screen 108. Moreover, each of the second rollers 114 engages the divider 46. Each of the second rollers 114 engages the primary surface 84 of the second track 80 corresponding to the second lifting unit 54 when the second screen 108 is positioned in the deployed position.

In use, the lid unit 26 is selectively positioned in the closed position to cover 28 the bed 16. The lid unit 26 is selectively positioned in the open position to accommodate an object that has a height greater than a height of the bed 16. The lid is positioned at a selected point between the minimum height and the maximum height. The wall unit 98 is selectively positioned deployed position to extend between the lid unit 26 and the bed 16. Thus, the wall unit 98 substantially encloses the object.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pickup cover system comprising:
   a vehicle having a cab and a bed, said bed having a peripheral wall, a top edge, a first lateral side and a second lateral side and an inwardly facing surface;
   a lid unit being movably coupled to said bed, said lid unit being selectively positioned in a closed position having said lid unit lying on said bed, said lid unit being selectively positioned in an open position having said lid unit being spaced a selected distance from said bed;
   a pair of lifting units, each of said lifting units being coupled between said bed and said lid unit, each of said lifting unit selectively urging said lid unit upwardly and downwardly with respect to said bed; and
   a wall unit being movably coupled to said lid unit, said wall unit being selectively positioned in a stored position having said wall unit being coextensive with said lid unit, said wall unit being selectively positioned in a deployed position having said wall unit extending between said lid unit and said bed when said lid unit is positioned in said open position wherein said wall unit is configured to protect objects in said bed; and
   a pair of sleeves, each of said sleeves having an upper end, a lower end and an outer wall extending therebetween, said outer wall having an inner surface, said outer wall corresponding to each of said sleeves being coupled to said inwardly facing surface of said bed, each of said sleeves being vertically oriented in said bed, said upper end corresponding to each of said sleeves being aligned with said top edge of said bed, said sleeves being spaced apart from each other, wherein each of said sleeves has a tab being coupled to and extending inwardly from said inwardly facing surface, said tab being coextensive with said associated sleeve.

2. The system according to claim 1, wherein said lid unit comprises a cover having a top wall and a perimeter wall extending downwardly therefrom, said perimeter wall having a first lateral side, a second lateral side, a front side, a back side and a distal edge with respect to said top wall, said distal edge being aligned with and being coextensive with said top edge of said bed, said distal edge abutting said top edge when said lid unit is positioned in said closed position, said distal edge being spaced from said top edge when said lid unit is positioned in said open position.

3. The system according to claim 2, wherein said top wall has a lower surface, said cover having a divider being spaced from said lower surface to define a storage space, said storage space being open on each of said first lateral side and said second lateral side corresponding to said cover.

4. The system according to claim 3, wherein said wall unit comprises a first screen comprising a plurality of hinged sections, said first screen having a lower surface, said first screen being slidably positioned in said storage space, said first screen extending substantially between said front side and said back side of said cover, said first screen being selectively positioned in a deployed position having said first screen extending downwardly between said cover and said bed when said lid unit is positioned in said open position.

5. The system according to claim 4, further comprising a plurality of first rollers, each of said first rollers being coupled to said lower surface of said first screen, each of said first rollers engaging said divider, each of said first rollers engaging said primary surface of said second track corresponding to said first lifting unit when said first screen is positioned in said deployed position.

6. The system according to claim 3, further comprising a second screen comprising a plurality of hinged sections, said second screen having a lower surface, said second screen being slidably positioned in said storage space, said second screen extending substantially between said front side and said back side of said cover, said second screen being selectively positioned in a deployed position having said second screen extending downwardly between said cover and said bed when said lid unit is positioned in said open position.

7. The system according to claim 6, further comprising a plurality of second rollers, each of said second rollers being coupled to said lower surface of said second screen, each of said second rollers engaging said divider, each of said second rollers engaging said primary surface of said second track corresponding to said second lifting unit when said second screen is positioned in said deployed position.

8. The system according to claim 2, further comprising:
   a cover; and
   a pair of pistons, each of said pistons being coupled between said peripheral wall of said bed and said cover, each of said pistons selectively urging said cover away from said top edge of said bed.

9. The system according to claim 1, wherein said pair of lifting units includes a first lifting unit and a second lifting unit, said first lifting unit being coupled to said first lateral side of said bed, said second lifting unit being coupled to said second lateral side of said bed.

10. The system according to claim 1, wherein each of said lifting units comprises a plate having a bottom surface and a top surface, said bottom surface being coupled to said top edge of said bed.

11. The system according to claim 1, further comprising:
    a cover having a distal edge; and
    a pair of bracket units, each of said bracket units being slidably positioned in an associated one of said sleeves, each of said bracket units being coupled to distal edge of said cover, each of said bracket units extending between said cover and said associated sleeve when said lid unit is positioned in said open position.

12. The system according to claim 11, wherein:
    said lid unit includes a divider;
    each of said sleeves has a tab; and
    each of said bracket units comprises:
      a first track having a first side, said tab on said associated sleeve slidably engaging said first side of said first track;
      a second track having a first end and a primary surface, said second track having a bend thereon, said bend being aligned with said first end to define a hook, said first end being positioned beneath said divider; and
      a plurality of supports, each of said supports comprising a first half being hingedly coupled to a second half, each of said supports being hingedly coupled between said first track and said second track, said supports being spaced apart from each other and being distributed along each of said first track and said second track, each of said first track and said second track being positioned in said associated sleeve when said lid unit is positioned between an minimum height and a maximum height, said second track being spaced from said first track when said lid unit is positioned at said maximum height such that said second track is positioned above a plate.

13. A pickup cover system comprising:
a vehicle having a cab and a bed, said bed having a peripheral wall, a top edge, a first lateral side, a second lateral side and an inwardly facing surface;
a lid unit being movably coupled to said bed, said lid unit being selectively positioned in a closed position having said lid unit lying on said bed, said lid unit being selectively positioned in an open position having said lid unit being spaced a selected distance from said bed, said lid unit comprising:
- a cover having a top wall and a perimeter wall extending downwardly therefrom, said perimeter wall having a first lateral side, a second lateral side, a front side, a back side and a distal edge with respect to said top wall, said distal edge being aligned with and being coextensive with said top edge of said bed, said distal edge abutting said top edge when said lid unit is positioned in said closed position, said distal edge being spaced from said top edge when said lid unit is positioned in said open position, said top wall having a lower surface, said cover having a divider being spaced from said lower surface to define a storage space, said storage space being open on each of said first lateral side and said second lateral side corresponding to said cover,
- a pair of lifting units, each of said lifting units being coupled between said bed and said lid unit, each of said lifting unit selectively urging said lid unit upwardly and downwardly with respect to said bed, said pair of lifting units including a first lifting unit and a second lifting unit, said first lifting unit being coupled to said first lateral side of said bed, said second lifting unit being coupled to said second lateral side of said bed, each of said lifting units comprising:
  - a plate having a bottom surface and a top surface, said bottom surface being coupled to said top edge of said bed,
  - a pair of sleeves, each of said sleeves having an upper end, a lower end and an outer wall extending therebetween, said outer wall having an inner surface, said outer wall corresponding to each of said sleeves being coupled to said inwardly facing surface of said bed, each of said sleeves being vertically oriented in said bed, said upper end corresponding to each of said sleeves being aligned with said top edge of said bed, said sleeves being spaced apart from each other, each of said sleeves having a tab being coupled to and extending inwardly from said inwardly facing surface, said tab being coextensive with said associated sleeve,
  - a pair of bracket units, each of said bracket units being slidably positioned in an associated one of said sleeves, each of said bracket units being coupled to distal edge of said cover, each of said bracket units extending between said cover and said associated sleeve when said lid unit is positioned in said open position, each of said bracket units comprising:
    - a first track having a first side, said tab on said associated sleeve slidably engaging said first side of said first track,
    - a second track having a first end and a primary surface, said second track having a bend thereon, said bend being aligned with said first end to define a hook, said first end being positioned beneath said divider, and
  - a plurality of supports, each of said supports comprising a first half being hingedly coupled to a second half, each of said supports being hingedly coupled between said first track and said second track, said supports being spaced apart from each other and being distributed along each of said first track and said second track, each of said first track and said second track being positioned in said associated sleeve when said lid unit is positioned between an minimum height and a maximum height, said second track being spaced from said first track when said lid unit is positioned at said maximum height such that said second track is positioned above said plate; and
- a pair of pistons, each of said pistons being coupled between said peripheral wall of said bed and said cover, each of said pistons selectively urging said cover away from said top edge of said bed; and
a wall unit being movably coupled to said lid unit, said wall unit being selectively positioned in a stored position having said wall unit being coextensive with said lid unit, said wall unit being selectively positioned in a deployed position having said wall unit extending between said lid unit and said bed when said lid unit is positioned in said open position wherein said wall unit is configured to protect objects in said bed, said wall unit comprising:
- a first screen comprising a plurality of hinged sections, said first screen having a lower surface, said first screen being slidably positioned in said storage space, said first screen extending substantially between said front side and said back side of said cover, said first screen being selectively positioned in a deployed position having said first screen extending downwardly between said cover and said bed when said lid unit is positioned in said open position,
- a plurality of first rollers, each of said first rollers being coupled to said lower surface of said first screen, each of said first rollers engaging said divider, each of said first rollers engaging said primary surface of said second track corresponding to said first lifting unit when said first screen is positioned in said deployed position,
- a second screen comprising a plurality of hinged sections, said second screen having a lower surface, said second screen being slidably positioned in said storage space, said second screen extending substantially between said front side and said back side of said cover, said second screen being selectively positioned in a deployed position having said second screen extending downwardly between said cover and said bed when said lid unit is positioned in said open position, and
- a plurality of second rollers, each of said second rollers being coupled to said lower surface of said second screen, each of said second rollers engaging said divider, each of said second rollers engaging said primary surface of said second track corresponding to said second lifting unit when said second screen is positioned in said deployed position.

* * * * *